Sept. 23, 1941.   G. G. HIGBEE   2,256,675
LOCK SWITCH FOR MOTOR DRIVEN VEHICLES
Filed Sept. 17, 1940   2 Sheets-Sheet 1

Inventor
George G. Higbee
By Clarence A. O'Brien
Attorney

Sept. 23, 1941.　　　　G. G. HIGBEE　　　　2,256,675
LOCK SWITCH FOR MOTOR DRIVEN VEHICLES
Filed Sept. 17, 1940　　　2 Sheets-Sheet 2

Inventor
George G. Higbee

By Clarence A. O'Brien

Attorney

Patented Sept. 23, 1941

2,256,675

UNITED STATES PATENT OFFICE 2,256,675

LOCK SWITCH FOR MOTOR DRIVEN VEHICLES

George G. Higbee, Santa Barbara, Calif.

Application September 17, 1940, Serial No. 357,177

5 Claims. (Cl. 200—44)

The present invention relates to new and useful improvements in switch structures for the ignition or lighting circuit of a motor driven vehicle, and has for its primary object to provide a switch member embodying a pair of spring projected, pivoted jaws adapted to normally maintain the switch contacts in open position, and arranged to receive a key to release the jaws or dogs to permit movement of one of the contacts into circuit closing position.

An important object of the present invention is to provide a switch structure of this character connected directly to the battery of the vehicle whereby to prevent unauthorized use of the car.

A still further object is to provide a switch of this character of simple and practical construction, which is efficient and reliable in performance, relatively inexpensive to manufacture and install in operative position and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which—

Figure 1:
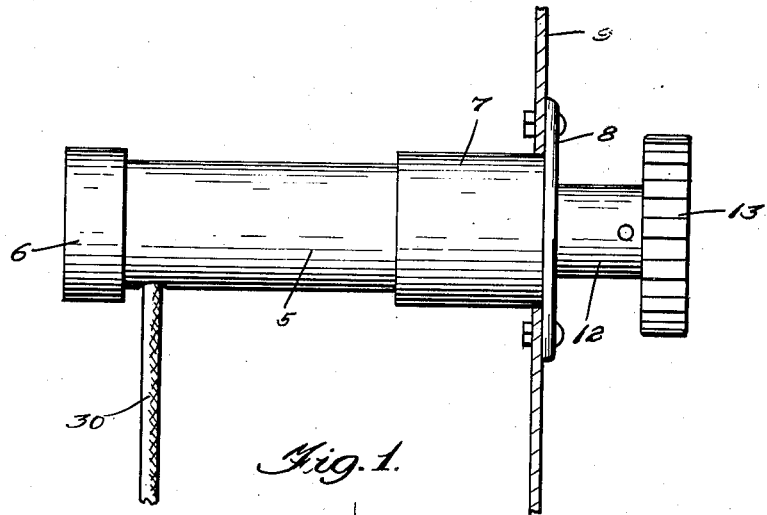
Figure 1 is a side elevational view with parts shown in section.
Figure 2:
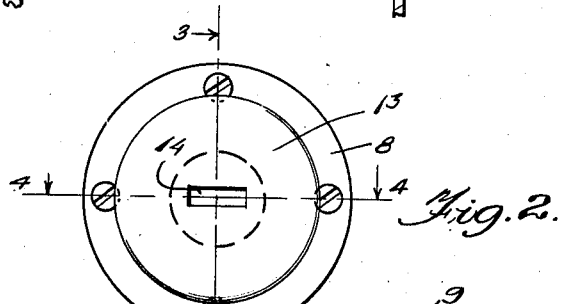
Figure 2 is a front end elevational view.
Figure 3:
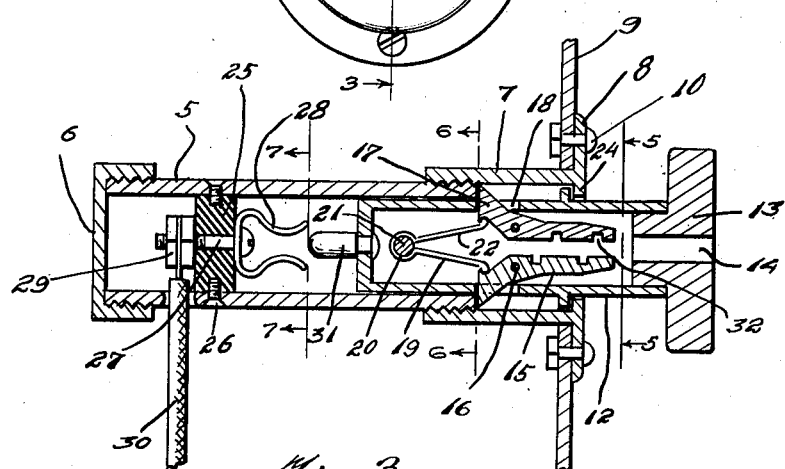
Figure 4:
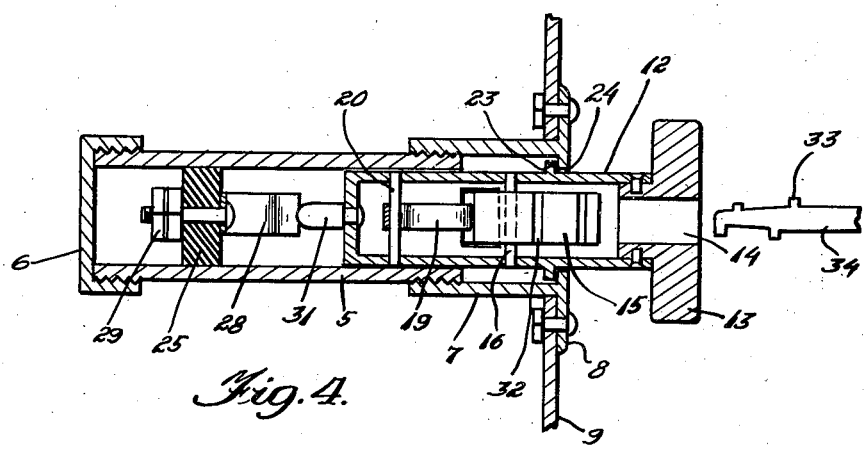
Figure 5:
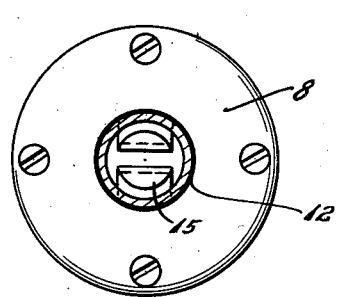
Figure 6:
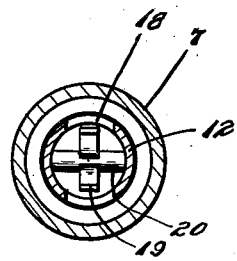
Figure 7:
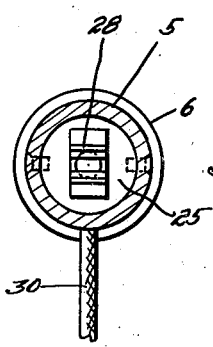

Figure 3 is a longitudinal sectional view taken substantially on the line 3—3 of Figure 2, Figure 4 is a similar view taken at right angles to Figure 3, and Figures 5, 6 and 7 are transverse sectional views taken respectively on the line 5—5, 6—6 and 7—7 of Figure 3.

Referring now to the drawings in detail, wherein for the purpose of illustration I have disclosed a preferred embodiment of the invention, the numeral 5 designates a switch barrel having one end closed by a threaded cap 6 and having its other end threaded within an attaching collar 7 provided with a flange 8 which is secured to the instrument panel 9 of the vehicle by means of screws or bolts 10. The collar 7 is provided with an opening 11 through which a plunger 12 is slidably mounted, the plunger being of tubular construction and having a knob 13 secured to its outer end. The knob is provided with a slotted opening 14 extending therethrough.

A pair of locking dogs 15 are pivotally mounted in the plunger by means of pins 16, the dogs having one end extending longitudinally in the plunger in spaced relation as shown to advantage in Figure 3 of the drawings, and the other ends of the dogs extend in diverging relation as shown at 17 and adapted for projection through slotted openings 18 formed in the diametrically opposite sides of the plunger 12. The dogs are yieldably urged outwardly by means of a U-shaped spring member 19 having its bight portion formed into a substantially split ring 20 which is pivotally mounted on a transverse pin 21 carried by the plunger. The ends of the spring diverge outwardly as shown at 22 for engaging the adjacent ends of the dogs for urging the same outwardly through the openings 18. When projected outwardly of the plunger the dogs engage the adjacent end of the barrel 5 to prevent inward sliding movement of the plunger. Stop flanges 23 and 24 are formed on the collar 7 and plunger 12 to limit outward sliding movement of the plunger.

An insulation block 25 is secured in the barrel 5 adjacent its inner end by means of screws 26, the block having a screw 27 extending longitudinally therethrough and to one end of which is secured a U-shaped spring contact clip 28 while terminal nuts 29 are threaded on the other end of the screw for attaching the circuit wire 30 thereto.

To the inner end of the plunger 12 is secured an inwardly projecting contact 31 normally maintained out of engagement with the contact 28 when the plunger 12 is secured in its outermost position and adapted for closing the circuit with the contact clip 28 upon an inward movement of the plunger.

The circuit wire 30 leads to the battery of the car and the circuit is grounded through the frame of the car by means of the plunger 12 and the ends of the dogs 17 which will have their engagement with the inner walls of the barrel 5 when the plunger is moved into its inner position.

The opposed faces of the dogs 15 are provided with staggered slots 32 adapted to receive the projections 33 on the opposite sides of a key 34 when inserted into the opening 14 whereby a turning movement of the key will spread the outer ends of the dogs apart to release the inner ends from the end of the barrel 5 and permit the plunger to be moved inwardly to close the circuit.

It is believed the details of construction, advantages and manner of use of the device will be readily understood from the foregoing without further detailed explanation.

Having described the invention, what I claim is—

1. A switch comprising a barrel having a contact fixed therein adjacent one end and insulated from the barrel, a collar for anchoring the barrel to a supporting structure to provide a ground connection therefor, a plunger slidably mounted in the barrel and having a contact on its inner end engageable with the fixed contact, abutting flanges on the plunger and the collar to limit outward movement of the plunger and a dog pivotally carried by the plunger and releasably engageable with the outer end of the barrel to retain the contacts out of engagement.

2. A switch comprising a barrel having a contact fixed therein adjacent one end and insulated from the barrel, a collar for anchoring the barrel to a supporting structure to provide a ground connection therefor, a plunger slidably mounted in the barrel and having a contact on its inner end engageable with the fixed contact, abutting flanges on the plunger and the collar to limit outward movement of the plunger and a pair of key actuated dogs pivoted in the plunger and releasably engageable with the outer end of the barrel to retain the contacts out of engagement.

3. A switch comprising a barrel having a contact fixed therein adjacent one end and insulated from the barrel, a collar for anchoring the barrel to a supporting structure to provide a ground connection therefor, a plunger slidably mounted in the barrel and having a contact on its inner end engageable with the fixed contact, abutting flanges on the plunger and the collar to limit outward movement of the plunger, and a pair of dogs pivoted in the plunger with one end engageable with the outer end of the barrel to retain the contacts out of engagement, the other ends of the dogs being spaced apart and adapted to receive a key therebetween to release the dogs from the barrel.

4. A switch comprising a barrel having a contact fixed therein adjacent one end and insulated from the barrel, a collar secured to the other end of the barrel and having an attaching flange to provide a ground connection with a supporting structure, a plunger slidably mounted in the barrel and in the collar, said plunger having openings therein, a contact on the inner end of the plunger movable into engagement with the fixed contact, a pair of spring projected dogs pivoted in the plunger having one end movable outwardly through the openings for engagement behind the outer end of the barrel to secure the plunger against inward movement, abutting flanges on the plunger and on the collar to limit outward movement of the plunger said dogs having their other ends spaced apart and a handle secured to the outer end of the plunger and having a keyhole adapted to receive a key for insertion between the spaced ends of the dogs to release the same from the barrel.

5. A switch comprising a barrel having a contact fixed therein adjacent one end and insulated from the barrel, a collar secured to the other end of the barrel and having an attaching flange to provide a ground connection with a supporting structure, a plunger slidably mounted in the barrel and in the collar, said plunger having openings therein, a contact on the inner end of the plunger movable into engagement with the fixed contact, a pair of spring projected dogs pivoted in the plunger having one end movable outwardly through the openings for engagement behind the outer end of the barrel to secure the plunger against inward movement, abutting flanges on the plunger and on the collar to limit outward movement of the plunger said dogs having their other ends spaced apart and a handle secured to the outer end of the plunger and having a keyhole adapted to receive a key for insertion between the spaced ends of the dogs to release the same from the barrel, said dogs having slots on their opposed faces and said key having lugs receivable in the slots to match therewith.

GEORGE G. HIGBEE.